United States Patent [19]
Auler

[11] 3,767,175
[45] Oct. 23, 1973

[54] SURFACE AERATOR HAVING WAVE ATTENUATOR
[75] Inventor: Herbert Auler, Aarbergen, Germany
[73] Assignee: Passavant-Werke, Germany
[22] Filed: Jan. 24, 1972
[21] Appl. No.: 220,176

[30] Foreign Application Priority Data
Feb. 3, 1971   Germany.................. P 21 04 985.4

[52] U.S. Cl.................... 261/91, 210/242, 261/120, 261/92, 61/3, 61/49
[51] Int. Cl. .......... B01f 3/04, B01f 7/16, B01f 7/02
[58] Field of Search...................... 210/242; 261/91, 261/92, 120

[56] References Cited
UNITED STATES PATENTS
2,186,371   1/1940   Durdin, Jr............................ 261/91

Primary Examiner—Tim R. Miles
Assistant Examiner—Steven H. Markowitz
Attorney—Roberts B. Larson et al.

[57] ABSTRACT

An apparatus for surface aerating liquids. A surface aerator arranged in a tank creates horizontally directed surface flow which forms into waves as the flow progresses through the tank and impinges upon and is reflected from the tank wall. Baffles, preferably horizontal plates, are formed on the tank walls at these impingement zones to attenuate the waves by eliminating the vertical energy component thereof. These baffle plates are preferably arranged just below the surface of the liquid. At any given impingement zone, there may be either a single baffle plate or a plurality of such plates arranged one above the other.

11 Claims, 4 Drawing Figures

Patented Oct. 23, 1973

3,767,175

SURFACE AERATOR HAVING WAVE ATTENUATOR

BACKGROUND OF THE INVENTION

This invention relates to surface aeration, and in particular it relates to an aeration tank having at least one surface aerator operating therein and including means for controlling the characteristics of the horizontal flow created by such surface aerator or aerators.

In the operation of surface aerators in an aeration tank, surface waves are created. Depending upon the shape and size of the tank, these waves can build up by overlapping, reflection against the tank wall, etc., to become stationary or moving waves of considerable height. As a consequence thereof, the submerged depth of the surface aerator varies considerably and the aerator does not therefore work at optimum efficiency. Furthermore, waves result in considerable mechanical stresses, thus endangering the surface aerator as well as other equipment arranged in the surface area. In addition, waves impair the normal operation of such items and devices such as inlets, outlets, weirs, scum removal devices, etc., and such waves may even throw liquid into a neighboring tank.

Previous attempts to counteract the formation of waves have included assymetrical arrangements of surface aerators, selecting various speeds or submergence depth, etc., but these have not been very successful and have led to the disadvantage that the aerator does not always operate at optimum efficiency.

Thus, there is a need to eliminate the disadvantages resulting from wave formations in a surface aerating apparatus.

SUMMARY OF THE INVENTION

Thus, it is a purpose of this invention to provide a new and improved apparatus for the effective attenuation of surface waves while concurrently maintaining optimum operating efficiency and economy.

This purpose is achieved in accordance with the present invention by providing in the surface aerating tank one or several baffle plates which extend in a generally horizontal direction and which are located on or just below the surface of the liquid at or near the tank wall at least within that zone, hereinafter referred to as the impingement zone, at which the horizontally directed flow from a given surface aerator impinges on the tank wall.

It has been found that such baffle plates influence the wave formation and reflection at the tank wall by splitting the incoming waves before they impinge upon the tank wall so the vertical energy of the waves is changed into horizontally directed flow energy. The reflected residual waves may again be attenuated where they subsequently impinge on the tank wall at a secondary impingement zone so that at least by the second impingement of said wave on the tank wall, the wave formation is substantially eliminated. These baffle plates have the advantage of being very simple and inexpensive, and they can easily be added to any existing plant without interfering with the existing aeration apparatus or the flow patterns essential in such existing apparatus to accomplish aeration.

The baffle plates are preferably installed in such a way as to be at least generally horizontal. In certain particular cases, it might even be preferable to tilt them slightly relative to a true horizontal plane. Such slight tilting is included in the phrase "generally horizontal." But more often, the plates will actually extend in a plane which is as close as is practically possible to the horizontal.

The baffle plates according to the present invention are thin flat plates such as sheets or wooden boards. Clearly it will be understood that any other suitable material such as thin concrete or plastic plates may also be used. In general, the baffles will have planer parallel top and bottom surfaces, although in some cases they may have specific profiles, for example it may be desirable to corregate the tops and bottoms, and in other instances it may be desirable to give the plates a profile which is streamlined relative to the horizontally directed flow.

In an aeration tank, having several aerators, each surface aerator is preferably coordinated to have associated therewith one baffle plate which is arranged within the primary impingement zone where the horizontally directed flow from that surface aerator first impinges on the tank wall. Further baffle plates may be associated with each surface aerator for receiving and attenuating residual waves which are reflected from the primary impingement zone where such reflected waves again impinge on the tank wall.

The baffle plates should extend over 3 to 5 per cent of the area of the liquid surface under the effect of a given surface aerator. It has been found that within this range attenuation of waves is particularly effective even if the dimensions of the baffle plate are still relatively small.

In a circular aeration tank, it is preferred to arrange the baffle plates as circular segments located within the primary impingement zones. Round aeration tanks having surface aerators located in the center thereof and directing flow outwardly in all directions may be provided with an arrangement in which the baffle plates are located annularly all around the tank wall or only around a substantial part of the tank wall.

The baffle plates are preferably arranges symetrically with respect to a line bisecting the angle between the direction of the surface flow as it impinges on the tank wall and the direction of the reflection of the wave from the tank wall. Depending on the height of the waves to be attenuated and on the extent to which the surface water is involved in the horizontally directed flow, it may be advantageous to utilize instead of a single baffle plate a plurality of such baffle plates arranged one above the other.

Thus, it is an object of this invention to provide a new and improved arrangement for efficiently attenuating surface waves in a surface aerating apparatus.

It is another object of this invention to provide a surface aerating apparatus having generally horizontal baffle plates located in the vicinity of the impingement zones of the horizontal flow created by the surface aerators for attenuating the waves formed in such surface flow.

Other objects and the advantages of the present invention will become apparent from the detailed description to follow together with the accompanying drawings.

BRIEF SUMMARY OF THE DRAWINGS

There follows a detailed description of preferred embodiments of the invention to be read together with the accompanying drawings.

DETAILED DESCRIPTION OF THE PREFERRED EMBODIMENTS

Referring now to the figures, like elements are represented by like numerals throughout the several views.

Figures 1, 1A:
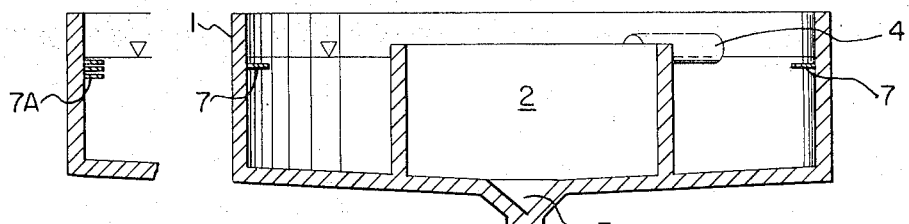
FIG. 1 and FIG. 2 are sectional views and plan views, respectively, of an annular aeration tank having a pair of horizontal axis aeration rotors located therein and baffle plates constructed in accordance with the present invention.
FIG. 1a shows a modification of FIG. 1.
Figure 2:
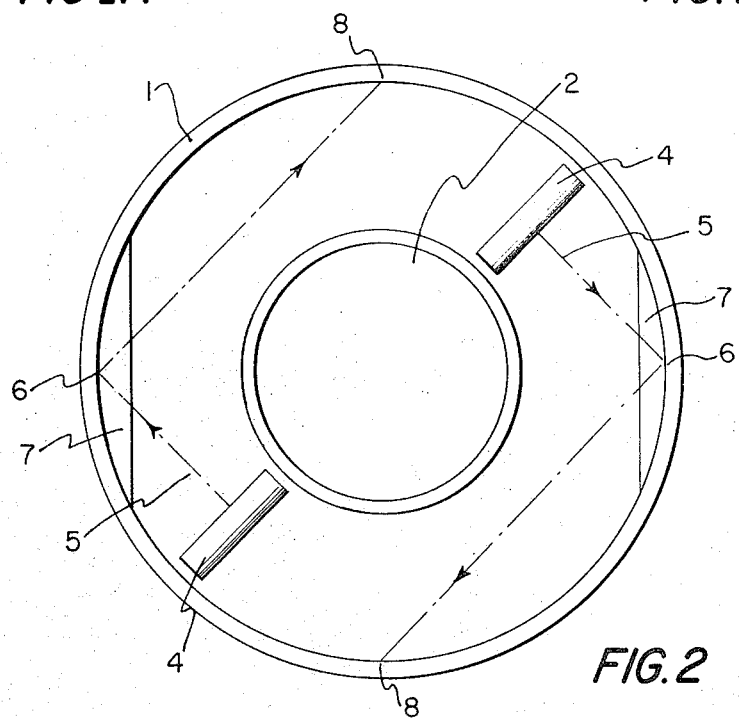

FIGS. 1 and 2 show an aeration tank 1 of a sewerage treatment plant arranged annularly around a circular primary or secondary settling tank 2 with a sludge sump 3. The aeration tank 1 for aeration of the waste water is provided with a pair of horizontal axis aeration rotors 4 which are shown schematically in FIGS. 1 and 2. For simplicity, the bridge carrying the aeration rotors and spanning the tank, the drive for the rotors and the aeration blades are not shown in the drawings. These elements are of course known per se.

The aeration rotors 4 generate a horizontally directed flow as indicated by the arrows 5 which at their primary points of impingement 6 are reflected by the tank wall as shown by the dotted lines. This reflection on the tank wall can repeat itself several times. Overlapping of waves and concave formations and other causes can create extremely large waves. In order to prevent this formation of waves, horizontal baffle plates 7 are arranged at the tank wall in the vicinity of the surface of the liquid but preferably just beneath the surface. These plates are arranged within the zone where the horizontal flow first impinges upon the tank wall, i.e. the primary impingement zone. It has been found advantageous to locate these baffle plates 7 approximately ten centimeters beneath the normal "calm" liquid surface. These baffles 7 effect a horizontal splitting of the incoming horizontally directed flow therefore acting to remove the crest of the wave from the remainder thereof. Consequently, the vertical component of the energy of the wave is eliminated and converted into horizontally directed flow energy. The waves are thus very much attenuated, as a result of which the aeration rotors 4 operate at generally a constant submerged depth.

FIG. 1a illustrates a modification of the present invention, according to which several baffle plates 7a are provided rather than a single baffle plate 7, the plates 7a being arranged one above the other.

After the waves have been split up and substantially attenuated by the baffles 7, they impinge on and are reflected by the tank walls immediately behind the baffle plates after which the surface flow must again pass across the baffle plates 7 before proceeding to a secondary impingement point 8. During this flow from the tank wall back across the baffle 7, the waves are further broken up such that surface waves therein are substantially eliminated by the time the surface flow reaches the secondary impingement point 8. However, if desired or necessary, additional baffle plates may be provided at the secondary impingement point 8.

Figure 3:
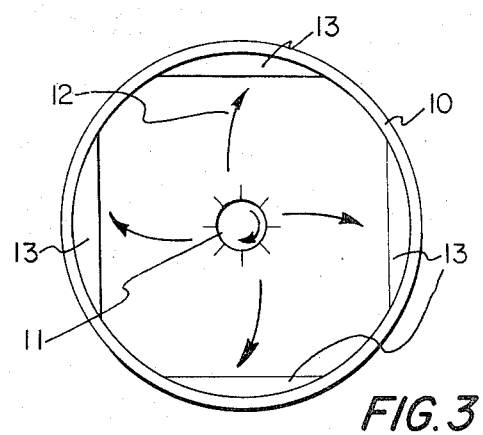
FIG. 3 is a plan view of a circular aeration tank with a vertical axis surface aerator and baffle plates constructed in accordance with the present invention.

FIG. 3 illustrates another embodiment of the invention in which the annular aeration tank 1 is replaced by a circular aeration tank 10 having at its center a vertical axis surface aerator 11 creating a horizontally directed flow in the form of a generally radial outward spiral pattern and shown by the arrows 12. At the tank wall, the surface flow indicated by the arrows 12 impinge upon plates 13 arranged and operating in substantially the same way as the baffles 7. In view of the rotational symmetry of the flow generated by the vertical axis surface aerator 11, the baffle plates can be arranged as an annulus completely encircling the inside of the wall of the aeration tank 10. Or, as shown in FIG. 3, a plurality of circular segment baffle plates 13, like the baffle plates 7 of FIGS. 1 and 2, can be spaced about the wall of tank 10. In addition to the arrangement shown in FIG. 3, an eccentric arrangement of the surface aerator 11 can be provided to counteract a detrimental superimposition of the waves reflected by the tank wall.

Numerous variations are of course permitted within the spirit and scope of the invention. To list only a few examples of such variations, the baffles may be installed not only at the outer tank walls, but also at the inner tank walls. The baffles need not be located precisely horizontally, but they may be tilted. Further, the baffle plates need not be flat but may be corrugated or otherwise of non-uniform thickness. Other modifications and variations are of course apparent to those skilled in the art without departing from the spirit and scope of the invention.

I claim:

1. An apparatus for aeration of liquids comprising:
   an aeration tank,
   at least one surface aerator arranged in said tank and including means for creating a horizontally directed surface flow of said liquid which impinges upon the wall of the aeration tank at an impingement zone,
   at least one baffle plate means located on the wall of the tank at the impingement zone, said plate means extending generally horizontally and located vertically in the vicinity of the liquid surface no higher than the calm liquid level for attenuating the vertical energy of waves created by said surface flow as the said horizontally directed flow flows across said baffle plate means, said tank wall being continuous above the baffle plate means so as to be capable of retaining liquid in the tank at a level above the baffle plate means.

2. An apparatus according to claim 1, wherein said baffle plate means includes a generally flat plate which extends substantially horizontally in said tank.

3. An apparatus according to claim 1, wherein said tank is annular in shape and said surface aerator is arranged to direct its surface flow generally perpendicular to a radial plane of the tank.

4. An apparatus according to claim 3, including a plurality of said surface aerators, each surface aerator creating a said horizontally directed surface flow which impinges on the wall of the tank at a respective impingement zone, and a said baffle plate located at each said impingement zone.

5. An apparatus according to claim 3, wherein said surface flow is reflected at said impingement zone and impinges on the wall of the tank at a secondary impingement zone and including a further baffle plate means on the tank wall at said secondary impingement zone.

6. An apparatus according to claim 1, wherein the baffle plate means extends over approximately three to five per cent of the area of the liquid surface of the tank affected by the surface aerator.

7. An apparatus according to claim 1, said tank having a circular outer wall and said baffle plate means located on said circular outer wall comprising plates in the shape of segments of a circle when viewed from above.

8. An apparatus according to claim 1, said tank having a circular outer wall, and said baffle plate means located on said circular outer wall and extending annularly around substantially the entire outer wall of the tank.

9. An apparatus according to claim 1, wherein said baffle plate means is arranged symmetrically with respect to a line bisecting the angle formed between the direction of the horizontally directed flow as it impinges on said wall and the direction of the reflection of that flow from said wall at the said impingement zone.

10. An apparatus according to claim 1, said baffle plate means including at least two baffle plates arranged one above the other, generally parallel to each other at said impingement zone.

11. An apparatus according to claim 1, wherein said tank is circular and includes a surface aerator at the center thereof creating surface flow generally radially outwardly therefrom, and a plurality of said baffle plate means located around the outer wall of the tank to receive said surface flow.

* * * * *